（12）United States Patent
Elangovan et al.

(10) Patent No.: US 7,876,747 B2
(45) Date of Patent: Jan. 25, 2011

(54) METHOD AND APPARATUS FOR EFFICIENT LOAD DISTRIBUTION ON LINK AGGREGATIONS

(75) Inventors: Anusankar Elangovan, San Jose, CA (US); Paolo Zarpellon, Mountain View, CA (US); Suran S De Silva, Cupertino, CA (US); Rodney Fong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1419 days.

(21) Appl. No.: 11/072,487

(22) Filed: Mar. 4, 2005

(65) Prior Publication Data

US 2006/0198381 A1 Sep. 7, 2006

(51) Int. Cl.
*H04L 12/50* (2006.01)
*H04L 12/28* (2006.01)
*H04L 12/56* (2006.01)

(52) U.S. Cl. .................................. 370/382; 370/395.7

(58) Field of Classification Search ................ 370/389, 370/392, 408, 401, 382, 395.7, 395.71, 412–417, 370/475, 395.32, 395.31, 395.3; 711/216
See application file for complete search history.

(56) References Cited

U.S. PATENT DOCUMENTS

| | | | |
|---|---|---|---|
| 5,949,786 A * | 9/1999 | Bellenger | 370/401 |
| 5,959,968 A | 9/1999 | Chin et al. | |
| 6,163,543 A | 12/2000 | Chin et al. | |
| 6,298,061 B1 | 10/2001 | Chin et al. | |
| 6,457,058 B1 * | 9/2002 | Ullum et al. | 709/238 |
| 6,473,424 B1 | 10/2002 | DeJager et al. | |
| 6,591,303 B1 | 7/2003 | Hendel et al. | |
| 7,069,436 B1 * | 6/2006 | Akachi | 713/162 |
| 7,408,935 B2 * | 8/2008 | Yazaki et al. | 370/392 |
| 2001/0043602 A1 * | 11/2001 | Brown | 370/392 |
| 2003/0223413 A1 * | 12/2003 | Guerrero | 370/389 |

OTHER PUBLICATIONS

"Link Aggregation According to IEE 802.3ad," Oct. 2002, SysKonnect GmbH, 22 pgs.
"EtherSwitch PRO16 Installation and User Guide," Kalpana, Inc. May 1, 1995, pp. v to xii; xvii; 2-32; 3-33; and 7-91 to 7-94.

* cited by examiner

*Primary Examiner*—Chirag G Shah
*Assistant Examiner*—Srinivasa R Reddivalam
(74) *Attorney, Agent, or Firm*—Cesari and McKenna, LLP

(57) ABSTRACT

A system for providing a substantially balanced distribution of traffic over an aggregation of output lines carrying digital information makes use of m random or pseudo-random bits substantially greater in number than the number of bits (n) used for selection of individual lines. The m bits address a table populated with n-bit entries whose bit combinations correspond with the respective output lines, with the relative numbers of the bit combinations being such as to provide substantially equal loads on the individual lines.

29 Claims, 1 Drawing Sheet

METHOD AND APPARATUS FOR EFFICIENT LOAD DISTRIBUTION ON LINK AGGREGATIONS

FIELD OF THE INVENTION

This invention relates to aggregated links that interconnect a pair of nodes in a data network. More particularly it relates to the selection of individual links interconnecting two nodes so as to obtain substantially even traffic loads on the links.

BACKGROUND INFORMATION

In order to increase the bandwidth of the connection between a pair of network nodes, multiple physical links between the nodes may be used by aggregating them into a single logical link. This has the advantage, not only of increasing the bandwidth but also increasing the reliability of the connection, since, if one of the links fails, the other links in the aggregation can maintain the connection. IEEE standard 802.3ad covers link aggregation.

Ideally, the load carried by an aggregation is equally distributed among its component links. Otherwise, if some links are loaded to capacity while others are not, the advantage of link aggregation is partially lost. IEEE 802.3ad specifies that traffic belonging to a particular "flow" always needs to travel over the same link in order to avoid out-of-order problems. This prevents the use of such load balancing schemes as Round Robin, etc.

Accordingly, it has been proposed to use a random or quasi-random function to select individual links for transmission of the respective data packets. A typical prior link selection unit provides for up to eight links. Parameters such as the MAC addresses of the source and destination, or their IP address, etc., are concatenated and applied to a hash-code function that provides an output vector. This vector is decoded to identify one of the physical ports that steer the traffic to the individual links. This works well if there are exactly the number of ports that can be selected by the output vector (e.g. three-bit output vectors and eight ports). However the user may require fewer ports and this can lead to a load-balancing problem.

For example, assume that in a particular deployment the link aggregation comprises three links. Each time the hash-code is invoked, one link is selected. For a three-bit output from the hash code, capable of identifying up to eight links, three of the eight outputs are decoded to identify one of the links and three identify another link, leaving only two outputs to identify the third link. Thus, two of the links carry ⅜, or 37.5% of the traffic and the third carries 25%. This is an undue disparity, considering that ideally each link will carry 33.3% of the traffic.

SUMMARY OF THE INVENTION

We have overcome this problem by using a hash code that provides a substantially greater number of bits than are required to select among the links. The invention is applicable to the selection among any number of links. However, for simplicity we shall use as an example an 8-port arrangement, requiring three bits to identify individual ports. In that case we might provide an eight-bit hash code, resulting in 256 possible bit combinations. These bits are used to randomly select three-bit port identifications which, when decoded, select the individual ports.

More specifically if, for example, the link selection unit has eight output ports, an array with 256 entries can be populated with 3-bit port identifications, with equal numbers of entries for the respective ports. The array is addressed with the eight random bits provided by the hash code to provide a random selection of entries. Since these are selected at random, the respective ports will also be randomly selected.

Consider next the arrangement in which there are only three links. An array addressed by the eight-bit hash code can be populated with only the 3-bit identifications of the three corresponding ports. Again the array is populated as equally as possible with these identifications. Thus two of the identifications occupy 85 array locations each and the third occupies 86 locations. This results in an almost equal selection of the ports by the random addressing of the array provided by the hash code. Specifically, two of the ports will be selected 33.2% of the time and the third 33.6% of the time.

The foregoing example assumes that the hash code provides a substantially random distribution of its outputs. If this is not the case, the population of the array addressed by the hash code can be skewed to provide substantially equal selection of the output ports. This technique can also be used to substantially eliminate the effects of any other factors that may cause a substantially unequal distribution of the loads carried by the respective links.

The invention can also be used to balance traffic when not all of the links have the same capacity. In that case, the array is populated with link identifiers in proportion to the capacities of the respective links.

BRIEF DESCRIPTION OF THE DRAWINGS

The invention description below refers to the accompanying drawings, of which

DETAILED DESCRIPTION OF AN ILLUSTRATIVE EMBODIMENT

Figure 1:
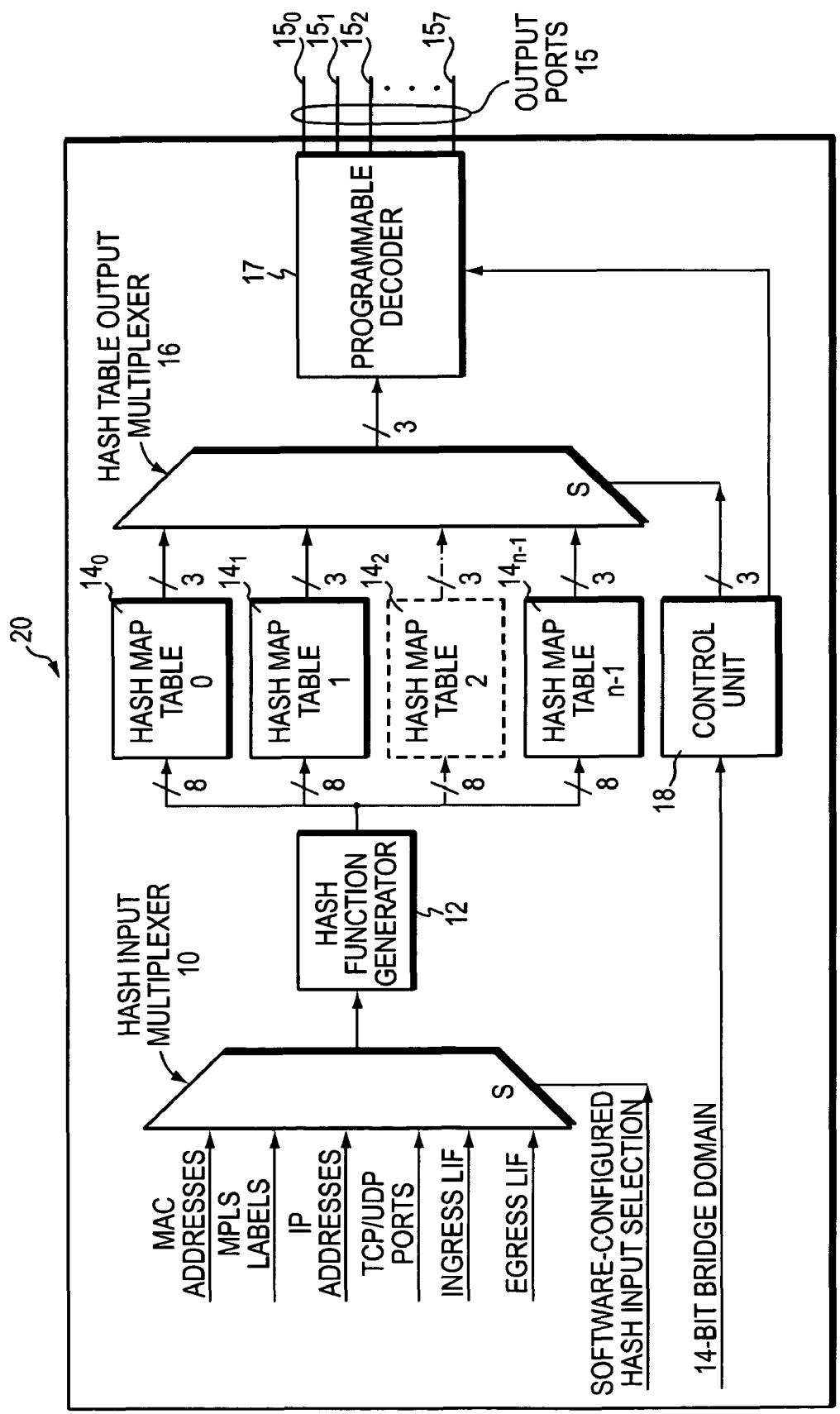
FIG. 1 is a diagram of a port selection unit incorporating the invention

In the preferred embodiment of the invention, the line selection unit 20 includes a hash input multiplexer 10 that selects among a number of inputs, such as the source and destination MAC (Medium Access Control) addresses, the source and destination IP (Internet Protocol) addresses Logical Interfaces (VLAN/port) and other inputs that remain unchanged for the duration of a multi-packet message to be transmitted over an output line (not shown). The output of the multiplexer 10 is applied to a hash-function generator 12 that provides a random, or pseudo-random, 8-bit number that is used to address a group of hash tables $14_0$-$14_7$. As described below, these tables are populated with three-bit codes, each of which, in the simplest case, identifies a single one of eight output ports $15_0$-$15_7$. The outputs of these ports direct data packets to selected output lines (not shown).

Specifically, outputs of the hash tables $14_0$-$14_7$ are selected by an output multiplexer 16 that is controlled by a control unit 18 in response to one or more selection criteria, such as a bridge domain identifier, a VLAN identifier, a TCP port number, etc. The three-bit output of the multiplexer 16, in turn, is applied to a decoder 17 that is programmed by an output of the control unit 18 to select an output port 15 in response to the code.

A simple example will convey the operation of the line selection unit 20. Assume that there is a single aggregation of three lines associated with output ports lines $15_0$, $15_1$, and $15_2$. Also assume that the multiplexer 10 is set to select the source and destination IP addresses. The hash function generator 12 converts the concatenation of these addresses into an 8-bit pseudo-random number that is supplied to the hash tables 14. The control unit 18 selector selects table $14_2$. That table is populated with the three-bit entries, 000, 001 and 010, for example, in substantially equal numbers. Specifically, two of the numbers occupy 85 locations each in the table $14_2$ and the third number occupies 86 locations. The 8-bit address supplied by the hash function generator randomly selects one of the locations and the 3-bit number in that location is applied to the decoder 17. The decoder in turn is programmed by the control unit 18 to use a decoding algorithm that converts the 3-bit numbers to designate the three output ports $15_0$, $15_1$ and $15_2$ in the example. If the addressed location in the table $14_2$ contains the number 001, for example, a line-selection signal is emitted at the output port $15_1$.

If the next concatenation of IP addresses is different from the previous one, the hash function generator 12 will generate a hash table address that is different from the first one. The location identified by that address may or may not contain the same port identification number as the first one. However, after a fairly short sequence of hash-function inputs, the random selection of locations in the table $14_2$ will result in a nearly equal distribution of selections of the ports $15_0$-$15_2$. It should be noted that with this arrangement, whenever the IP addresses are the same as a previous concatenation of such addresses, the line selection unit will select the same output port. This ensures that the consecutive packets of a data flow are delivered in order to their destination.

In the foregoing example, the hash table $14_2$ can be populated with any three 3-bit numbers, with the decoder 17 programmed to decode the output of the multiplexer 16 to select among the three desired output ports 15.

Furthermore, only four hash map tables are required to cover any desired combination of eight output ports. Thus the selection of one, two, four, or eight ports can be provided by a single table populated equally by all the three-bit numbers. The output of that table will be random (or pseudo-random), with the decoder 17 programmed to select the appropriate output ports according to the port identifications provided by the multiplexer 16. Similarly, a single hash table can be used for selection among three or six ports. The table is populated with six different 3-bit numbers in substantially equal proportions. Specifically, four of the numbers occupy 43 table locations and the other two occupy 42 locations. The decoder 17 is programmed to decode the outputs of the table to provide the desired selection of output ports. For selection among five or seven output ports separate hash map tables are required.

The preferred hash function generator is a Fibonacci-based linear feedback shift register (not shown), which generates a pseudo-random numbers in response to its input. The shift register is reset, e.g. cleared, prior to the processing of each of its inputs. Alternatively, one may use a single hash table and repopulate it in accordance with an output (not shown) of the control units. In some applications it may be desirable to vary the distribution of the numbers stored in the hash map tables. For example, the hash function generator 12 may not provide a truly random output so that certain 8-bit outputs of the generator are selected substantially more often than others. In that case, the proportions of the different numbers in each table may be skewed to offset the uneven distribution of table inputs.

What is claimed is:

1. A line selection unit for selecting one of a plurality of lines carrying data from a first unit to a second unit, individual lines being selectable by the decoding of a n-bit selection number, the unit comprising;
    (A) at least one addressable table containing m table locations, each of which is indexed by an address number and contains an n-bit selection number, wherein m is substantially greater than an amount of different n-bit selection numbers, such that a particular n-bit selection number is contained in a plurality of different ones of the m table locations of the at least one table;
    (B) a random, or pseudo-random, number generator that generates an address number in response to an input and applies the address number to the at least one table for selection of one of the m table locations in the table, thereby providing as an output the n-bit selection number contained in the selected table location; and
    (C) means for decoding the n-bit selection number of the output to select one of said lines corresponding to the content of the selected table location therein.

2. The unit of claim 1 including means for providing the number generator an input in the form of a combination of source and destination identifiers of a packet to be transmitted over one of the lines.

3. The unit of claim 1 including means for providing the number generator with a same input for all packets in the same packet stream.

4. The unit defined in claim 1 including means for selecting the output of one of said at least one table, the decoding means being programmable in accordance with an output of said selecting means.

5. A method for selecting one of a plurality of lines carrying data from a first unit to a second unit, the method comprising:
    (A) generating a random or pseudo-random address number;
    (B) applying the address number to a table to select a table location in the table, the table having m selectable table locations, each of which contains an n-bit selection number, m being substantially greater than an amount of different n-bit selection numbers such that a particular n-bit selection number is contained in a plurality of the table locations of the table;
    (C) decoding the n-bit selection number in the selected table location to select one of said lines; and
    (D) transmitting a data packet from a port of the first unit to a port of the second unit over the selected said line.

6. The method of claim 5 in which the generating generates a same number for all the packets in a packet stream.

7. The method of claim 5 in which the address number is applied to a plurality of tables, each of which contains n-bit selection numbers that correspond to a plurality of said lines.

8. The method of claim 7 in which the generating generates the same number for all the packets in a packet stream.

9. The method of claim 7 including the steps of:
    (A) selecting one of said tables;
    (B) decoding the entries in the selected table; and
    (C) programming the decoding step at least partly in accordance with the number of different n-bit entries contained in the selected table.

10. An apparatus comprising:
    a number generator operable to generate a particular x-bit code in response to a parameter of a data packet;
    at least one table having m table locations, each table location indexed by a different x-bit code and containing an n-bit selection number, the at least one table operable to receive the particular x-bit code from the number generator and to output a particular n-bit selection number in response thereto;
    a decoder operable to receive the particular n-bit selection number, and to select in response thereto a particular link, of a plurality of links between the apparatus and another apparatus that are aggregated to operate as a single logical link, wherein x is substantially greater than n, such that there are a substantially greater number of bits in the x-bit code than needed to identify links, and wherein the particular n-bit selection number is contained in a plurality of different ones of the m table locations of the at least one table.

11. The apparatus of claim 10 wherein the number generator is a hash function generator, the code is a hash code, and the at least one table is a hash table.

12. The apparatus of claim 10 further comprising:

an input multiplexer operable to select the parameter of the data packet as one of, or a combination of, a plurality of fields of the data packet.

13. The apparatus of claim 10 wherein the parameter includes one or more identifiers selected from the group consisting of a Medium Access Control (MAC) address, an Internet Protocol (IP) address, a virtual local area network (VLAN) identifier, and a port number.

14. The apparatus of claim 10 wherein the at least one table comprises a plurality of tables and the apparatus further comprises:

an output multiplexer operable to select the output of a table in response to a selection criteria, and to provide the output of the selected table to the decoder.

15. The apparatus of claim 10 wherein the parameter of the data packet is a combination of a source and a destination identifier.

16. The apparatus of claim 10 wherein the number generator is operable to generate the same particular x-bit code in response to data packets of a same packet stream.

17. A method comprising:

generating a particular x-bit code in response to a parameter of a data packet;

applying the particular x-bit code to at least one table having m table locations, each table location indexed by a different x-bit code and containing an n-bit selection number;

in response to the applying, outputting from the at least one table a particular n-bit selection number;

decoding the particular n-bit selection number to select a particular link of a plurality of links that are aggregated to operate as a single logical link, wherein x is substantially greater than n such that there are a substantially greater number of bits in the x-bit code than needed to identify links, wherein m is greater than an amount of different n-bit selection numbers such that the particular n-bit selection number is contained in a plurality of different ones of the m table locations of the at least one table; and transmitting a data packet from a port of a first unit to a port of a second unit over the particular link.

18. The method of claim 17 wherein the code is a hash code, and the at least one table is a hash table.

19. The method of claim 17 further comprising:

selecting the parameter of the data packet as one of, or a combination of, a plurality of fields of the data packet.

20. The method of claim 17 wherein the parameter includes one or more identifiers selected from the group consisting of a Medium Access Control (MAC) address, an Internet Protocol (IP) address, a virtual local area network (VLAN) identifier, and a port number.

21. The method of claim 17 wherein the at least one table comprises a plurality of tables and the method further comprises:

selecting the output of a table in response to a selection criteria; and using the output of the selected table in the decoding.

22. The method of claim 17 wherein the parameter of the data packet is a combination of a source and a destination identifier.

23. The method of claim 17 wherein the generating generates the same particular x-bit code in response to data packets of a same packet stream.

24. The method of claim 17 further comprising:

varying the number of the m table locations of the at least one table that contain the particular n-bit selection number in proportion to a capacity of a link.

25. An apparatus comprising:

at least one addressable table including m table locations, each of the m table locations indexed by an address number and containing an n-bit selection number, wherein m is substantially greater than an amount of different n-bit selection numbers, such that a particular n-bit selection number is contained in a plurality of different ones of the m table locations of the at least one table;

a random, or pseudo-random, number generator operable to generate an address number in response to an input derived from a packet, and to apply the address number to the at least one table to select one of the m table locations in the table, to produce from the table an output of a particular n-bit selection number contained in the selected table location in the table; and a decoder operable to receive the output of the particular n-bit selection number contained in the selected table location in the table, and in response thereto to select a line, of a plurality of lines, to carry the packet.

26. The apparatus of claim 25 wherein the number generator is a hash function generator, the address number is a hash code, and the at least one addressable table is a hash table.

27. The apparatus of claim 25 further comprising:

an input multiplexer operable to select the input as one of, or a combination of, a plurality of fields of the packet.

28. The apparatus of claim 25 wherein the input is a combination of a source and a destination identifier of the packet.

29. The apparatus of claim 25 wherein the number generator is operable to generate the same address number in response to packets of a same packet stream.

* * * * *